May 29, 1928.  
W. T. GORTON  
1,671,281  
MOUNT FOR MACHINE GUNS  
Filed Aug. 20, 1925  
2 Sheets-Sheet 1
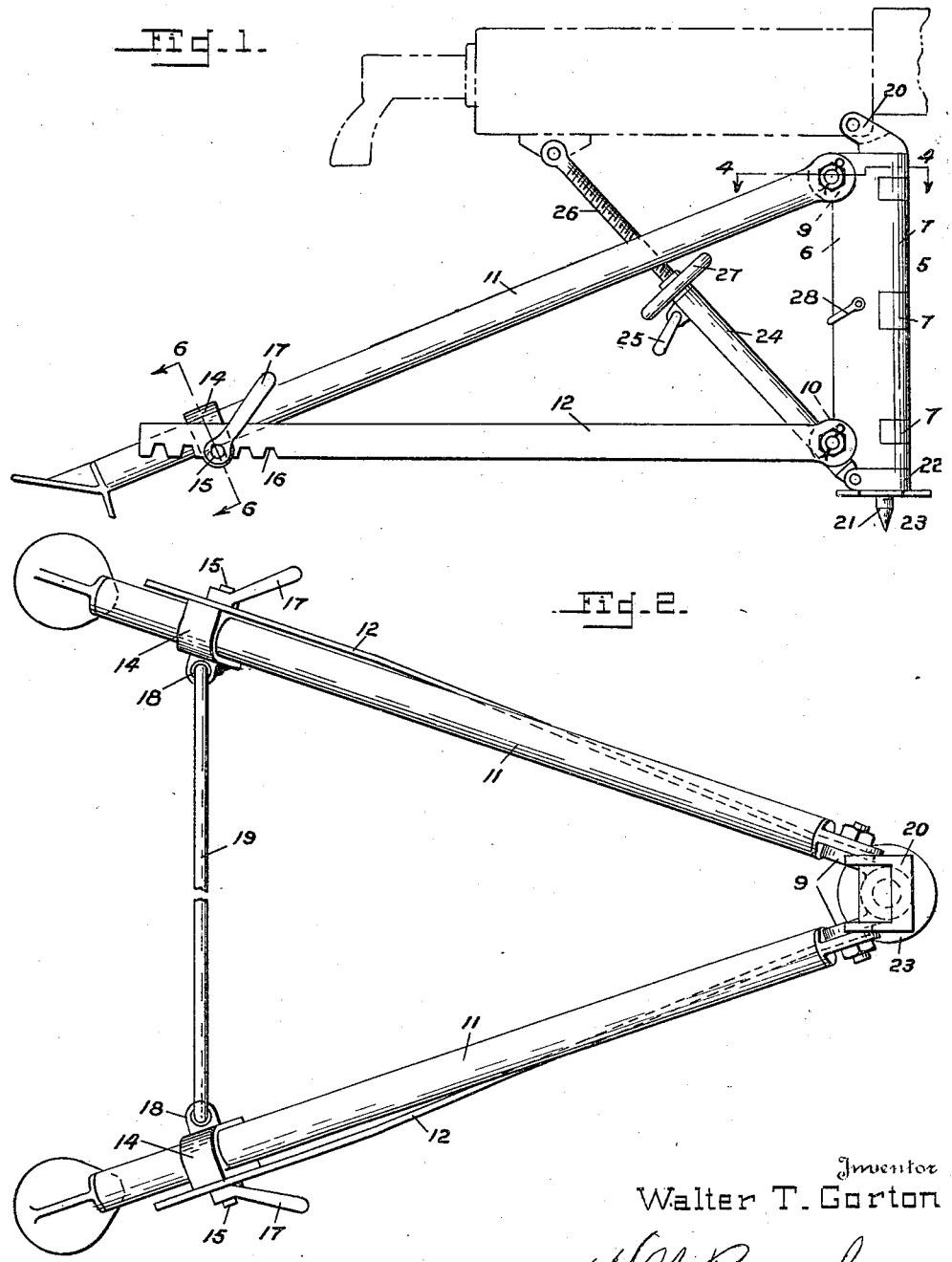
Inventor  
Walter T. Gorton  
By W. N. Roach  
Attorney

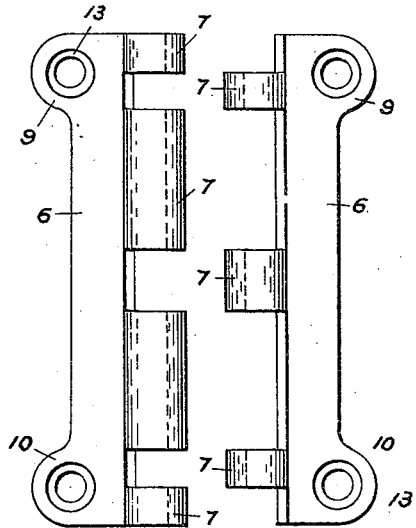
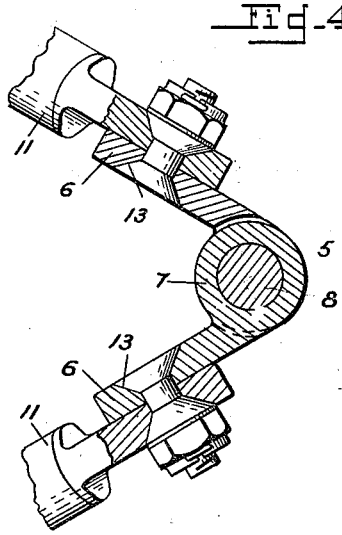
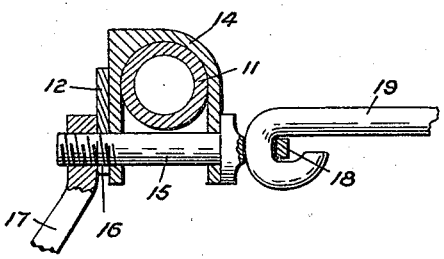
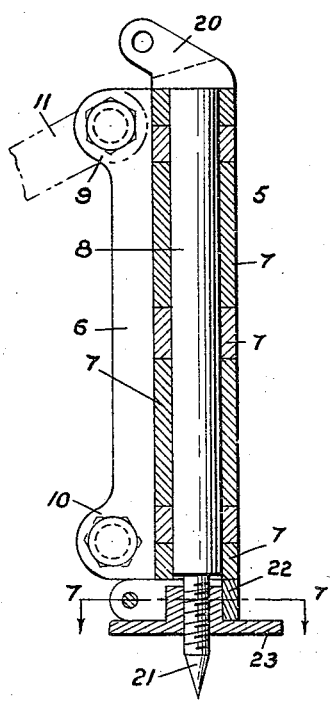
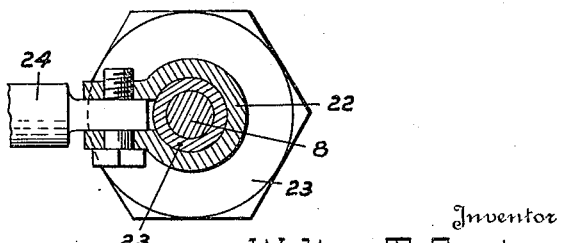

Patented May 29, 1928.

1,671,281

UNITED STATES PATENT OFFICE.

WALTER T. GORTON, OF THE UNITED STATES ARMY, SPRINGFIELD, MASSACHUSETTS.

MOUNT FOR MACHINE GUNS.

Application filed August 20, 1925. Serial No. 51,462.

(GRANTED UNDER THE PROVISIONS OF THE ACT OF MARCH 3, 1883, 22 STAT. L., 625.)

The invention described herein, if patented, may be manufactured and used by or for the Government for governmental purposes without the payment to me of any royalty thereon.

The subject of this invention is a mount for machine guns.

With the tactical employment of machine guns for overhead fire a confirmed success, considerable attention has been devoted to providing a more stable mount to safeguard advancing troops. The efforts directed to this end exhibit a tendency towards complicating the mount and increasing its weight, features which are undesirable, since the machine gun has been definitely assigned as an infantry weapon and must be capable of accompanying it in the advance.

The principal object of the present invention is to provide a rigid and stable mount possessing the essential characteristics of simplicity, light weight, facility in going into action and convenience in folding for transportation.

In attaining this end, the triangular arrangement of the members of the typical mount is adhered to for the purpose of securing rigidity, but a departure from the customary disposition of the members has been made. In the conventional tripod mount there is provided but a single, relatively long, and generally fixed leg which constitutes the trail and a pair of front legs which, as a rule, are compactly and adjustably secured to the tripod head. In the present invention this arrangement is reversed, the double or split trail affording greater rigidity for firing and convenience in folding for transportation as well as permitting a low mounting and a simple provision for directly supporting the rear of the gun.

The tripod head is essentially a strong hinge, each leaf carrying one of the trail legs and its adjusting member and the hinge pin constituting the front leg of the mount and formed at its upper end with a yoke for trunnioning the gun and having at its lower end means for attaching the elevating mechanism. This latter arrangement permits of a light construction of the yoke and hinge pin since the thrust of the gun is resisted throughout the full length of the tripod head.

To these and other ends, my invention consists in the construction, arrangement, and combination of elements, described hereinafter and pointed out in the claims forming a part of this specification.

A practical embodiment of the invention is illustrated in the accompanying drawings, wherein:

Fig. 1 is a view in side elevation of a mount constructed in accordance with the invention;

Fig. 2 is a plan view thereof;

Fig. 3 is a detail view in elevation of the leaves forming the tripod head;

Fig. 4 is a sectional view on the line 4—4 of Fig. 1;

Fig. 5 is a vertical sectional view of the tripod head;

Fig. 6 is a sectional view on the line 6—6 of Fig. 1; and

Fig. 7 is a sectional view on the line 7—7 of Fig. 5.

Referring to the drawings by numerals of reference:

The mount is in the form of a tripod, the head of which comprises a hinge 5 made up of the leaves 6—6 having alternating eyes 7—7 through which passes a hinge pin 8 constituting the front leg of the mount. Each leaf is provided with an upper lug 9 and a lower lug 10 to which are respectively joined a trail leg 11 and an adjusting brace 12. The joints are preferably formed with conical engaging surfaces indicated at 13 for the elimination of lost motion.

Fixed to each trail leg adjacent its foot is a collar 14 which carries a pin 15 for engaging in recesses 16 on the brace 12. A jamming handle 17 threaded on the pin serves to secure the brace in selected position. The brace 12 is provided to fix the trail leg with respect to the tripod head and to permit individual adjustability of the trail legs so that the axis of traverse may be maintained in a vertical position when erecting the tripod on uneven ground. By reason of the height of the leaves 6—6 and the large area of their bearing surfaces the trail legs will remain in adjusted position without the employment of a locking or clamping device. The normal spread of the trail legs will be about 60° and if desired the collars 14 may be provided with apertured ears 18 for the attachment of a tie rod 19 to secure the trail legs in the normal open position.

The front leg or hinge pin 8 is formed at its upper end with a yoke 20 for trunnioning the gun, while its lower end terminates in a point 21 to facilitate entrance into the ground. For convenience, in assembling, the foot of the front leg is preferably a composite unit consisting of a split collar 22 held against the lowermost eye 7 by means of a nut 23 threaded on the leg and receivable in a recess in the collar. The nut is headed and of convenient shape for contact with the ground.

The collar pivotally carries a sleeve 24 provided at its upper end with any suitable locking device 25 for locking an elevating screw 26 which is adapted to be attached to the gun for the support of its rear end and to serve as a means for moving the gun about its trunnions. A hand wheel 27 for actuating the screw 26 rests on the sleeve and operates in a well known manner.

In traversing the gun, the front leg 8 and elevating mechanism move as a unit, the latter being in such relation with respect to the trail legs that the amplitude of traverse is defined thereby. This prevents the gunner from inadvertently moving the gun beyond the spread of the trail legs and insures stability during firing.

Suitable means for locking the gun in position of azimuth may be provided at any convenient point, a preferred location being centrally in the tripod head and indicated by the locking handle 28 which may actuate a clamp (not shown) into and out of engagement with the front leg 8.

The favorable low mounting of the gun with respect to the tripod head and the disposition of the elevating mechanism places the resultant thrust on the mount when the gun is in its position of normal elevation within the base of the tripod and consequently affords greater stability than a single trail leg. Also by reason of the attachment to the gun at both the top and bottom of the front leg the thrust is better resisted and a separate cradle need not be employed.

In folding the tripod, the two trail legs are ordinarily simply swung together thus making a neat assembly for transportation. If a more compact folding is desired it is evident from the construction of the joints that the trail legs and the adjusting braces may parallel the tripod head.

While in the foregoing there has been illustrated and described such combination and arrangement of elements as constitute the preferred embodiment of my invention, it is nevertheless desired to emphasize the fact that interpretation of the invention should only be conclusive when made in the light of the subjoined claims.

I claim:

1. A mount for machine guns embodying a hinge, the hinge pin constituting the front leg of the mount, a trail leg pivotally secured to the upper end of each hinge leaf, a brace pivoted to the lower end thereof, means for selectively securing the brace to the trail leg adjacent its foot, a yoke on the upper end of the hinge pin for trunnioning a gun, a collar on the lower end thereof, an elevating mechanism pivoted to the collar, a headed nut threaded on the hinge pin for retaining the collar, said nut constituting the foot of the hinge pin.

2. A mount for machine guns embodying a hinge, the hinge pin constituting the front leg of the mount, a trail leg pivotally secured to the upper end of each hinge leaf, a brace pivoted to the lower end thereof, means for selectively securing the brace to the trail leg, a yoke on the upper end of the hinge pin for trunnioning a gun, a collar on the lower end thereof, an elevating mechanism pivoted to the collar, and means forming the foot of the hinge pin for retaining the collar.

3. A mount for machine guns embodying a hinge in which the hinge pin constitutes the front leg of the mount, a trail leg pivoted to the upper end of each hinge leaf, means on each leaf for adjustably securing a leg, a yoke on the upper end of the hinge pin for trunnioning a gun, a foot on said pin, a collar retained thereon by said foot and an elevating mechanism pivoted to the collar.

4. A mount for machine guns embodying a hinge in which the hinge pin constitutes the front leg of the mount, a trail leg pivoted to the upper end of each hinge leaf, means on each leaf for adjustably securing a leg, a yoke on the upper end of the hinge pin for trunnioning a gun, a foot on said pin, and an elevating mechanism adapted to be carried by the foot.

5. A mount for machine guns embodying a hinge in which the hinge pin constitutes the front leg of the mount, a trail leg pivoted to the upper end of each hinge leaf, means on each leaf for adjustably securing a leg, a yoke on the upper end of the hinge pin for trunnioning a gun, and a foot on said pin.

6. A mount for machine guns embodying a pair of hinge leaves, a trail leg pivoted to each leaf, means for adjustably securing each trail leg, and a hinge pin including a yoke constituting the front leg of the mount.

7. A mount for machine guns embodying a pair of hinge leaves, a trail leg pivoted to each leaf, means for adjustably securing each trail leg, and a hinge pin constituting the front leg of the mount.

8. A tripod mount embodying a pair of hinged trail members having vertical adjustability, and a member serving as a hinge pin and constituting the front leg of the mount.

9. A tripod mount embodying a pair of hinged trail members, and a member serving as a hinge pin and constituting the front leg of the mount.

10. A tripod mount embodying a fixed front leg and a pair of trail legs mounted for both horizontal and vertical adjustability with respect to said fixed leg.

11. A tripod mount embodying a fixed front leg, and a pair of trail legs pivoted to said leg.

12. A mount for machine guns embodying a fixed front leg, a pair of trail members, and an elevating mechanism carried by the front leg and adapted to be limited in traverse by the trail members.

13. A mount for machine guns embodying hinged trail members, the hinge extending practically the height of the mount, and a hinge pin constituting the front leg of the mount.

14. A mount for machine guns embodying a head, a pair of trail legs secured thereto, and a front leg positioned axially of the head.

15. A mount for machine guns embodying a vertical member, means for trunnioning a gun on the upper end of said member and an elevating mechanism on the lower end thereof for supporting the rear of the gun.

WALTER T. GORTON.